Aug. 18, 1936.      A. KUNTKE ET AL      2,051,411

X-RAY APPARATUS

Filed Feb. 10, 1932

Inventors.
Alfred Kuntke and Willem Hondius Boldingh.
By

Patented Aug. 18, 1936

2,051,411

UNITED STATES PATENT OFFICE 2,051,411

X-RAY APPARATUS

Alfred Kuntke and Willem Hondius Boldingh, Eindhoven, Netherlands, assignors to N. V. Philips' Gloeilampenfabrieken, Eindhoven, Netherlands Application February 10, 1932, Serial No. 592,120
In the Netherlands February 14, 1931

12 Claims. (Cl. 250—34)

Our invention relates to an X-ray installation for taking both radioscopies and radiographs, and is particularly important in connection with making instantaneous exposures.

Prior installations for this purpose comprise, as a rule, a device for supplying different energies to the X-ray tube in order that the tube may operate during the exposure with a higher energy radiation than is required for fluoroscopy. Generally, the X-ray tube is movable to enable an accurate adjustment of the source of rays relative to the object to be irradiated.

Our invention relates to an installation which takes advantage of the fact that the conditions for fluoroscopic examination are in many respects opposite to those for taking an exposure. For taking radiographs it is not only desirable that a higher energy radiation be used, but also that, to obtain a photograph of sharp definition, the tube be at a greater distance from the ray-sensitive layer and the object than is required in fluoroscopy. The main purpose of fluoroscopic examination is, in most cases, to select those parts of the object to be radiographed, and the definition of the image is of minor importance. Furthermore, the fluoroscopy must last for several minutes, whereas a radiograph is completed within a few seconds or even in a fraction of a second.

The X-ray installation according to the invention comprises at least two X-ray tubes disposed on the same side of the object to be irradiated. One of these tubes, referred to hereinafter as the "exposure tube", serves only for taking radiographs and may be stationary, whereas the second tube, referred to hereinafter as the "fluoroscopic tube" serves only for fluoroscopy and is movably arranged at a shorter distance from the place to be occupied by the object than is the exposure tube.

The installation according to the invention operates in the following manner: The fluoroscopic tube is placed in operation and the object to be irradiated is located within the ray-beam of this tube. By moving the fluoroscopic tube in a plane parallel to an image screen, that portion of the object of which a more detailed X-ray photograph is to be taken can be readily located. The radiograph is then made by means of the exposure tube, which is arranged at a greater distance from the object than is the fluoroscopic tube.

If the exposure tube has a fixed position so that its ray-cone strikes the image screen within a constant framing, it is generally desirable to move the object until the parts to be irradiated are in the proper position relative to the framing. For this purpose the object, together with the fluoroscopic tube connected in circuit, are moved until the radioscopic image of the portion to be radiographed falls within the area accessible to the X-ray beam of the exposing tube. To make the use of an extremely large image screen unnecessary, the screen may be mechanically interconnected with the fluoroscopic tube so as to follow the movements thereof.

To permit the object to be readily moved into its correct position relative to the X-ray beam, we provide a carrying device which can be moved, if desired by mechanical means. In subjecting persons to irradiation a hydraulic lifting device may be used, whereby the person can be lifted without any exertion to any desired height and with an accurate vertical adjustment. As a rule, the horizontal adjustment is not difficult, although a mechanical device may also be used for this purpose.

As the floroscopic tube is disposed near the object, it does not need to be dimensioned for such a great energy as is the exposure tube. For instantaneous exposures, it is very advantageous to use an exposure tube having an anode which rotates during operation, whereas it is preferable that the fluoroscopic tube, which requires less energy but for a longer time, be a tube of lower power having an anode provided with a cooling device.

For the convenient handling of the installation, it is in some cases preferable to provide switches associated with either the main circuit or with the auxiliary circuit of the exposure tube. These switches are so interconnected with the device for operating the fluoroscopic tube that they are prevented from occupying or being moved into their position necessary for placing the exposure tube into operation, unless the fluoroscopic tube is located in its off-position. By "off-position" of the fluoroscopic tube is meant the position occupied by this tube while the exposure is being made and which position is outside of the ray-cone of the exposure tube.

By arranging the above-mentioned switch or system of switches so that they are moved by an operating device of the fluoroscopic tube into that position in which the exposure tube becomes operative, the exposure is automatically made when the fluoroscopic tube is being moved into its off-position after the fluoroscopy has taken place. On the other hand, if movement of the fluoroscopic tube into its off-position merely permits the energization of the exposure tube without actually effecting same, a safety device is obtained which prevents the exposure tube from being prematurely placed in circuit, and consequently prevents a faulty exposure.

Such a switch may, for example, control the filament heating circuit of the cathode of the exposure tube. In addition, or in lieu thereof, the switch may be associated with the circuit which causes rotation of the anode of the exposure tube—if the tube is of the rotary anode type—or a second switch controlled by the position of the fluoroscopic tube may be provided for establishing the last-mentioned circuit.

Our invention is very important in connection with X-ray installations in which the energy for making the radiographs is obtained from a condenser which has been previously charged to a sufficiently high voltage. In such installations, the high-tension transformer supplying charging current to the condenser may also supply the operating current for the fluoroscopic tube which may be included in the charging circuit of the condenser. However, as the charging current decreases as the voltage of the condenser increases during the charging, and thus the fluoroscopic tube would be able to emit rays for only a limited time, we prefer to provide a switch—if desired with a limiting resistance connected in series therewith—to shunt the condenser. This shunt circuit is opened when the condenser is to be charged and the installation may, if desired, be so arranged that the opening of this circuit is also effected by, or made possible through, the displacement of the fluoroscopic tube into its off-position.

It is also possible to provide a device by which the supply voltage for the condenser charging circuit is cut out when the circuit for the exposure tube is established. In the operation of such a device it is possible to make the exposure after the charging of the condenser has been initiated by moving the fluoroscopic tube into its off-position. However, if the switch shunting the condenser is maintained in its open position by an auxiliary current, it should not be closed by the deenergization of this circuit while the supply voltage of the charging circuit is being cut off, as in this case a discharge would occur through said switch. Therefore the shunt switch may be operated by a time relay which moves with a time delay from its position corresponding to the open shunt switch into its other position.

The filament heating current for the exposure tube cathode, and the current for causing rotating of the anode, may flow through a similar relay, if desired through the same relay. In such case, the switch serving to interrupt the primary current of the supply transformer, and consequently the condenser charging current should be independent of the circuit closed by the time relay, as otherwise the two circuits would be interrupted simultaneously.

In addition, a safety switch may be provided to prevent the supply transformer from being cut out of circuit and thus to prevent the exposure tube from being placed in circuit unless the fluoroscopic tube occupies its off-position.

In order that our invention may be more clearly understood and readily carried into effect, we shall describe same more fully, by way of example, with reference to the accompanying drawing, in which.

Figure 1:
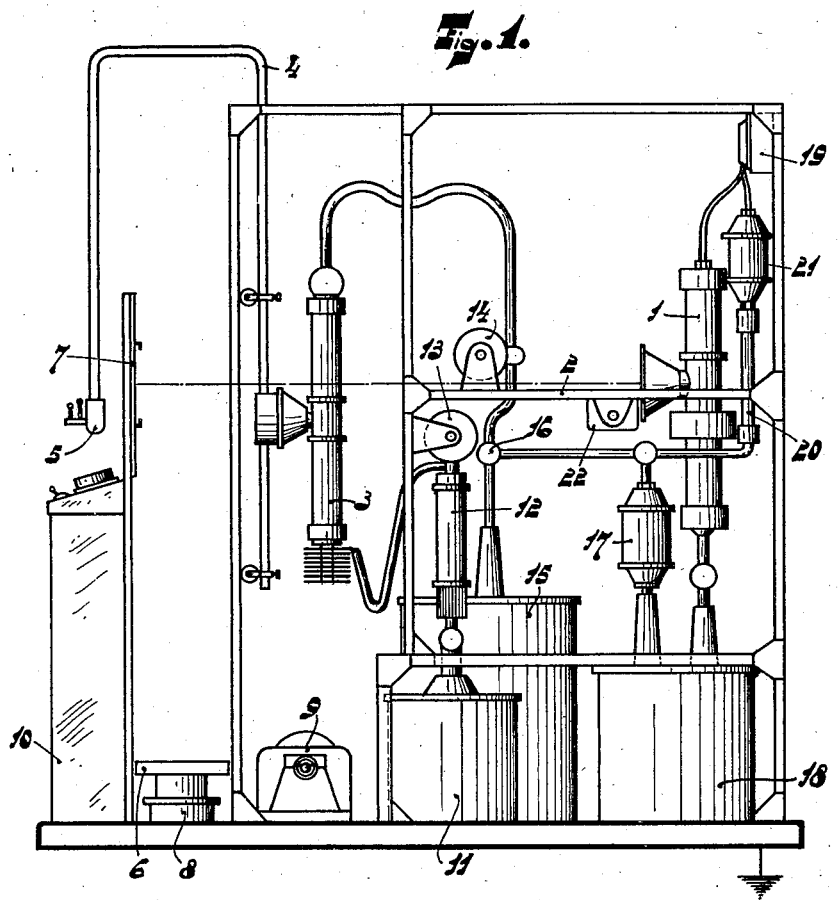
Figure 1 is a side elevation of an X-ray installation according to our invention, and shows the arrangement of the various parts.

The X-ray installation shown in Figure 1 comprises an exposure X-ray tube 1 and a fluoroscopic X-ray tube 3. The exposure tube 1 is fixedly mounted upon a frame work 2 and comprises a rotatable anode; whereas the fluoroscopic tube 3 is carried by an operating mechanism 4 comprising a U-shaped rod having on one end a handle 5 accessible to the operator. This mechanism permits the tube 3 to be moved both horizontally and vertically in a plane parallel to a projection screen 7.

A person to be subjected to irradiation may stand upon a supporting plate 6 and is thus located between the tube 3 and the screen 7. The focal distance of the tube 3 from the screen 7 is, for example, 75 centimeters, whereas that of the exposure tube is, for example, 2 meters. It is, of course, obvious that these distances may be varied in accordance with the characteristics of the tubes used.

If the tube 3 is placed in operation there is produced upon the screen 7 a radioscopy, which can be observed by an operator standing in front of the screen at the left hand side of the installation. The supporting plate 6 can be raised or lowered by means of a suitable hydraulic device 8 controlled by an electric motor 9. Thus the portions of the person to be irradiated after being located can be brought, under continuous observation of the radioscopy, into such a position relative to the location of a photographic film that the portion to be irradiated lies within the raycone of the tube 1.

Arranged at the left side of the apparatus is a control and instrument desk 10.

The fluoroscopic tube 3 is supplied with operating current from a high-tension transformer 11 having a high-voltage winding connected through a rectifying tube 12 to the tube 3.

The cathode of rectifier tube 12 is heated from an auxiliary heating transformer 13, whereas the cathode of X-ray tube 3 is heated from an auxiliary heating transformer 14; the windings of these two transformers being insulated from each other against high tension.

The transformer 11, rectifier tube 12, and the fluoroscopic tube form, together with a high-tension condenser 15, a closed circuit which is the charging circuit of the condenser 15.

In the rear of the installation are located the parts of the discharge circuit of the condenser 15. This circuit goes from one pole 16 of condenser 15 through an electrically-operated switch 17, a choke coil 18, and the X-ray tube 1 to the metal frame 2 which is grounded during the operation of the apparatus and to which are also connected the other poles of condenser 15 and of transformer 11. An auxiliary transformer 19, which need not be insulated against high tension, serves to heat the incandescent cathode of tube 1.

In addition a shunt consisting of a resistance 20 and an electrically-operated switch 21 is connected across the condenser 15, and a transformer 22 serves to supply current for rotating the anode of tube 1.

The various low-tension circuits are not shown in Figure 1, but will be described in connection with the circuit diagram of Figure 2 in which the various members are indicated by the same reference numerals as in Figure 1.

Figure 2:
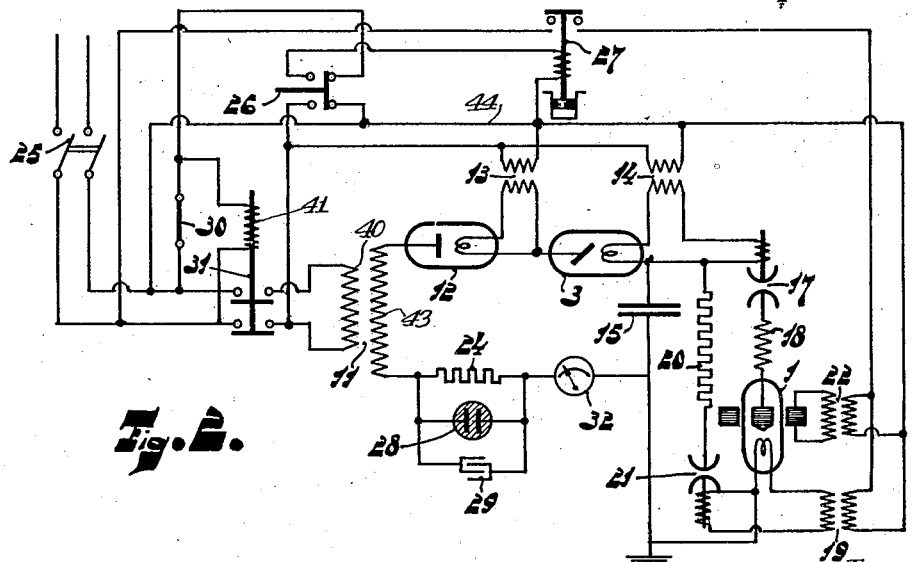
Figure 2 is a schematic circuit diagram of the installation shown in Figure 1.

As shown in Figure 2, the primary winding 40 of supply transformer 11 is connected through the contacts of an electrically-actuated doublepole switch 31, and of a main switch 25 to a suitable alternating-current supply, for instance the ordinary 220 volt mains.

The coil 41 of switch 31 has one end connected to one pole of switch 25 and its other end connected through a hand switch 30 to the other pole of switch 25. The contacts of relay 21 are normally closed, and upon closure of switch 25, a current can flow from one end of secondary winding 43 of transformer 11 through rectifying tube 12, fluoroscopic tube 3, resistance 20, relay 21, and a resistance 24, back to the other end of secondary winding 43.

The resistance 20 is given such a value that the voltage drop produced across same by the passage therethrough of a current of the magnitude required to operate tube 3 as a radioscopic tube is insignificantly small compared to the total voltage. If, for example, a current of 20 milliamperes is used for fluoroscopy, the resistance 20 may have a value of 105 ohms. Thus, the voltage drop across the resistance is 2000 volts which, at a total voltage of say 60 kilovolts, is relatively small. The resistance 20 serves to prevent, in case of a faulty connection, the passage of an excessive current through the relay switch 21, when the condenser 15 discharges.

The primary windings of filament supply transformers 13 and 14 are connected in parallel with one end connected through conductor 44 directly to one pole of switch 25 and with the other end connected through one pole of switch 31 to the other pole of switch 25. Thus transformers 13 and 14 are energized simultaneously with transformer 11 by closure of the switch 25 and the corresponding closure of switch 31, whereby the installation is ready for fluoroscopy. If, after the fluoroscopy has taken place, it is desired to charge the condenser 15 and then proceed with the exposure, the tube 3 is moved by means of the mechanism 4 (see Fig. 1) out of the radiation range of tube 1 and into its off-position.

The installation comprises a double-throw switch 26 operated by means of the mechanism 4 of Figure 1 and occupying its right-hand position as shown as long as the fluoroscopic tube is not in its off-position. If, however, tube 3 is moved into its off-position, switch 26 assumes its second or left-hand position and closes a circuit passing from one pole of the alternating current supply, across the left-hand contacts of switch 26, through the energizing coil of a relay switch 27, and back to the other pole of the supply.

Upon energization of its coil, relay 27 closes its contacts and a current flows from one pole of the supply, across the contacts of switch 27, through the primary windings of transformers 19 and 22 and back through conductor 44 to the other side of the supply. Consequently, the anode of exposing tube 1 starts rotating and the heating of the cathode of this tube is initiated.

The secondary winding of transformer 19, in addition to supplying heating current to the cathode of tube 1, also supplies energizing current to the coil of relay 21, which is a normally-closed relay, i. e., the contacts are open when the coil is energized. With contacts 21 open, condenser 15 is no longer short-circuited by resistance 20 and becomes charged up to a voltage which is substantially equal to the maximum value of the voltage supplied from transformer 11.

Connected in parallel with the resistance 24 is a glow discharge tube 28 which serves to indicate when the condenser has been charged to the proper amount. As the voltage of the condenser increases, the charging current flowing through resistance 24 decreases to such a value that the voltage drop across the resistance 24 is no longer sufficient to keep the tube 28 illuminated. Thus the extinguishment of this tube indicates that the condenser is sufficiently charged and the exposure can take place. A condenser 29 shunts tube 28 and serves to insure that the displacement current constantly flowing in the circuit does not produce in resistance 24 a voltage drop of sufficient value to cause ignition of tube 28.

When it is desired to proceed with the exposure, the switch 30 is opened. The switch 30 previously established a circuit passing through the coil 41 of switch 31 through the contacts of which flowed the current for transformers 11, 13 and 14. Upon deenergization of coil 41, energization of the charging circuit from the network ceases. As the coil of relay 17 is connected in series with the incandescible cathode of tube 3, deenergization of transformer 14 due to the opening of switch 30, will also deenergize relay 17 whereby its contacts will close and allow the discharge current to flow from the condenser 15 through the contacts of relay 17, inductance 18, X-ray tube 1, and back to the condenser 15. Thus a high-energy radiation of X-rays adapted to produce an exposure of short duration on the photographically-sensitive plate is obtained during a short time depending upon electric values of the condenser discharge circuit.

To prevent relay 21 and the incandescible cathode of tube 1 from being deenergized immediately upon the opening of switch 30, the relay 27 is provided with a time delay of such duration that it breaks its contacts only after the condenser has been allowed to discharge through the tube 1. As a rule, a time delay of a few tenths of a second will suffice. When, after the time delay, relay 27 has reoccupied its off-position as shown, the entire installation is currentless and is ready for a second exposure by closing switch 30. If this is done without moving the fluoroscopic tube 3 from its off-position, thus without moving switch 26 from its left-hand position, the condenser 15 obtains without delay a new charge. Should, with the condenser so charged, tube 3 be erroneously moved out of its off-position, the switch 26 would bridge its right-hand contacts, coil of switch 21 would become deenergized, and condenser 15 would discharge through switch 21. However as the limiting resistance 20 is present in the discharge circuit, the discharge will not proceed too vehemently so that in this respect the installation is protected from damage resulting from such faulty manipulation.

The right-hand contacts of the switch 26, which are closed when the tube 3 is in the center of the field of radiation, also serve as a safety means. If the tube 3 were moved out of its off-position after the condenser 15 had been charged, it would be possible, by opening auxiliary switch 30, to deenergize and open switch 31 before relay 21 becomes deenergized; relay 21 being controlled by the delay switch 27 which remains closed for a time interval after the switch 31 has opened. In this case the discharge of the condenser 15 would produce an undesired current flow through the X-ray tube 1. However, as the right-hand contacts of switch 26 are connected across switch 30 the installation is kept under tension even when the switch 30 is opened.

The installation is grounded at a point at which transformer 11, condenser 15, relay 21, and the incandescible cathode of the X-ray tube 1 are interconnected. For this reason, as is apparent from Figure 1, the transformer 11 and the condenser 15 must have only one pole insulated against high voltage, whereas the transformer 19 does not have to be insulated at all against high voltages. A measuring device 32 can be included in the lead at this point, which device, as well as the small indicator lamp 28, does not have to be insulated for high voltage against the grounded frame work, and can be simply mounted on the control desk 10.

For limiting the ray cone of the tube 3, movable diaphragms operated from the operator's position by means of Bowden wires and small regulating knobs on the handle 5 may be arranged in the directing cone of the said tube.

While we have described our invention in connection with specific examples and applications, we do not wish to be limited thereto but desire the appended claims to be construed as broadly as permissible in view of the prior art.

What we claim is:—

1. An X-ray installation comprising a stationary X-ray tube having an anode and a cathode adapted to be heated to incandescence, means comprising a source of current for energizing said cathode and a switch to interrupt the heating current to said cathode, a movably arranged X-ray tube for fluoroscopic examination, said movable tube when in operative position being located in the path of the X-rays of said first tube, means to shift said movable tube into an off position, said switch being in operative relation with said shifting means whereby said switch is opened when the movable tube is shifted from its off position into its operative position, and means for impressing an electromotive force across either of said X-ray tubes.

2. An X-ray installation comprising an X-ray tube adapted for making radiograph exposures, and a second X-ray tube adapted for fluoroscopic examination, a condenser adapted to be charged to a high tension, a transformer having a high-tension secondary winding, a circuit including said secondary winding, the second tube and said condenser, a shunt circuit across said condenser which when closed permits the supply of the operating voltage for said second tube for fluoroscopic examination, means to interrupt said shunt connection so as to permit a gradual charging of said condenser to a voltage approximating the maximum voltage induced in said high tension winding and means for interrupting the charging of said condenser and discharging the same through the exposure tube in a time interval which is short with respect to the charging time of the condenser.

3. An X-ray installation comprising an X-ray tube for making short-time radiograph exposures, a capacitor adapted to be charged to a high voltage, a charging circuit for gradually charging said capacitor, a high-tension transformer and a rectifier in said charging circuit, a second X-ray tube for screening work connected in said charging circuit, said exposure tube and screening tube each having an incandescible cathode, a heating circuit for the cathode of the exposure tube and a heating circuit for the cathode of the screening tube, a resistance and a relay-operated switch in series with said resistance, the two being connected in multiple to said capacitor, a second relay-operated switch in series with the exposure tube, the two being connected across said capacitor, the relay of the first switch being energized from the heating circuit of the cathode of the exposure tube and the switch being opened by the current flow in this circuit, and the relay of the second switch being energized from the heating circuit of the screening tube cathode, and this second switch being opened by current flowing in this circuit to prevent the discharge of the capacitor through the exposure tube, and means to automatically interrupt the heating circuit of the exposure tube cathode and to close the first relay switch a short time interval after the heating of the screening tube cathode is interrupted.

4. An X-ray installation comprising an X-ray tube adapted for making short-time radiograph exposures and an X-ray tube adapted for screening work, a high-voltage transformer having a primary and a secondary winding, a condenser adapted to be charged up to a high voltage by said transformer, a coil-operated switch and a manual switch, a primary circuit for said high-voltage transformer including said coil-operated switch, an energizing circuit for said coil comprising said manual switch, said energizing circuit being independent of said coil-operated switch, said exposure tube and screening tube each having an incandescible cathode, separate heating transformers for energizing the cathodes of said tubes, a circuit including said screening tube, said secondary winding and said condenser, a shunt across said condenser having ohmic resistance and comprising a relay operated switch, said relay being energized from the heating transformer of the exposure tube and said switch being open when its relay is energized, a second relay operated switch in series with the exposure tube and forming with said tube a shunt circuit across said condenser, the relay of said second switch being energized from the heating transformer of the screening tube and opening its switch when energized, the screening tube being movable and means for shifting it from its operating position to an off-position, a switching device and means interconnecting same with the said means for shifting the screening tube so as to be operated by the latter means, said switching device short-circuiting the manual switch when the screening tube is in its operating position and closing an auxiliary current circuit when the screening tube is in its off-position, a coil-actuated time-delay switch, the coil of the delay switch being energized by said auxiliary circuit, and the time-delay switch controlling the heating transformer of the exposure tube, energization of this heating transformer being independent of the coil-operated switch, the heating transformer for the screening tube cathode being controlled by said coil-operated switch.

5. An X-ray installation comprising a framework having a front wall, a rear wall, and a window in the front wall, a supporting plate for the patient to be radiated disposed before said front wall, a support disposed in front of said plate adapted to carry a fluorescent screen and a photographic cassette, a control panel on said support, an X-ray tube adapted for fluoroscopic work in said framework, said tube being movably disposed at a short distance in the rear of said front wall, means comprising a handle bar disposed in the vicinity of said control panel and adapted for moving said X-ray tube in a plane parallel to the front wall, a second X-ray tube adapted for taking radiographs, said second tube being fixedly mounted close to the rear wall of the framework and directing its rays through said window of the front wall, and a high-tension current source and connecting means between said source and said tubes, said high-tension source and connecting means being enclosed within said framework.

6. An X-ray installation comprising a stationary X-ray tube adapted for taking exposures of short duration, and a movable X-ray tube adapted for continuous screening work, an operative circuit for each of said tubes, said screening tube, in its operating position assuming an intermediate position between the exposure tube and the place to be irradiated, thus in the path of the X-rays of the exposure tube, means to shift the screening tube into an off-position and out of said path, means for switching on the current in the operative circuit of the exposure tube to place said exposure tube into operation, said latter means being in operative relation to said shifting means and so controlled thereby as to prevent the exposure tube from being placed into operation unless the screening tube occupies its off-position.

7. An X-ray installation comprising a stationary X-ray tube for making radiographs, a movable X-ray tube for fluoroscopic examination, said second tube, when in its operative position, being located in the path of the X-rays of said first tube and being movable into an off position outside of the path of said rays, a high-tension circuit including said first tube, a source of high-tension and a circuit-closer, a second high-tension circuit including a second source of high-tension and said second tube, said circuit-closer being interconnected with said movable tube whereby the closure of said circuit-closer is prevented unless the second tube is in its off-position, and said circuit-closer is opened when the second tube is removed from its off-position.

8. An X-ray installation comprising a stationary X-ray tube having an incandescent cathode and adapted for making radiographic exposures, a movable X-ray tube adapted for screening work, a high-tension transformer, a capacitor adapted to be charged to high tension by said transformer, a high-tension circuit including said first tube and said capacitor, a second high-tension circuit including said second tube and transformer, a third circuit including a source of current for energizing said cathode, a resistance and a coil-actuated switch in series connection across said capacitor, means to shift said second tube into an off-position outside of the X-ray beam of the first tube, said source being adapted to energize said coil to open said switch, a second switch disposed in said third circuit, means under the action of said shifting means to close said second switch when the second tube is in its off-position, said capacitor being gradually charged to a voltage approximating the maximum voltage of said transformer, and means to cause said capacitor to discharge through said exposure tube for a time interval which is short with respect to its charging time.

9. An X-ray installation comprising a stationary X-ray tube for taking radiographs and having a movable anticathode, said tube being provided with an electromagnetic stator for imparting rotative motion to said anticathode, a movably-arranged X-ray tube for fluoroscopic examination, high-tension operative circuits for said X-ray tubes including high-tension switches to switch on the operative currents of said X-ray tubes, means for shifting said movable tube into an off-position outside the path of the rays of the first tube, a circuit for said stator comprising an electrically-operated circuit-closer, and an operating circuit for said circuit-closer including means for initiating and terminating the current flow therein, said latter means being in operative relation with said means for shiftin the movable tube, whereby said circuit closer is closed when the movable tube is in its off-position.

10. An X-ray installation comprising an X-ray tube for making photographic exposures, a second X-ray tube for fluoroscopic examination, said first tube having a considerably higher load capacity than said second tube, said second tube being adapted to be continuously loaded with a power sufficient for its intended purpose, and means for supplying high tension to said tubes, said means comprising a high-tension condenser and a high-tension transformer, said transformer supplying both the charging energy for said condenser and the energy for said second tube, said condenser, after being charged up by said transformer to the working voltage of the first tube, supplying to this tube in a single-beat discharge the energy required for one exposure.

11. An apparatus for making radiographs of objects, comprising a stationary X-ray receiving means, a stationary radiographic X-ray tube fixed with respect to said means with its ray-path directed to energize said means, a fluoroscopic X-ray tube movably mounted between said means and said radiographic X-ray tube and movable into position with its ray path directed to energize said means and to a position of non-interference with the ray path of said radiographic tube, and an adjustable support for the object to be radiographed located intermediate said means and said fluoroscopic X-ray tube; said support, fluoroscopic tube, and X-ray receiving means being capable of relative adjustment to position the object by fluoroscopic examination in the ray-path of said radiographic tube.

12. An apparatus for making radiographs of a desired portion of an object comprising a stationary X-ray receiving means, a stationary radiographic X-ray tube fixed with respect to said means with its ray-path directed to energize said means, and means comprising a fluoroscopic X-ray tube movably mounted between said X-ray receiving means and said radiographic tube to position said fluoroscopic tube within the ray-path of said radiographic tube, said fluoroscopic tube being movable into an off-position of non-interference with the ray-beam of said radiographic tube and being movable in accordance with the placement of said object in positions intermediate the X-ray receiving means and fluoroscopic tube and into a position in which the desired portion of the object lies within the ray-path of the radiographic tube.

ALFRED KUNTKE.
WILLEM HONDIUS BOLDINGH.